(12) United States Patent
Kuroda et al.

(10) Patent No.: US 7,572,060 B2
(45) Date of Patent: Aug. 11, 2009

(54) SLIDING BEARING

(75) Inventors: Koji Kuroda, Inuyama (JP); Arihiro Kimura, Inuyama (JP); Ken Kitahara, Inuyama (JP); Keiko Kitahara, legal representative, Nagoya (JP); Atsushi Okado, Inuyama (JP); Masaaki Sakamoto, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 873 days.

(21) Appl. No.: 11/077,029

(22) Filed: Mar. 11, 2005

(65) Prior Publication Data

US 2005/0213859 A1 Sep. 29, 2005

(30) Foreign Application Priority Data

Mar. 12, 2004 (JP) ............................. 2004-069853

(51) Int. Cl.
*F16C 9/00* (2006.01)
*F16C 17/00* (2006.01)
*F16C 33/10* (2006.01)

(52) U.S. Cl. .................. 384/276; 384/286; 384/291
(58) Field of Classification Search ................ 384/276, 384/286–292
See application file for complete search history.

(56) References Cited

U.S. PATENT DOCUMENTS

| | | | |
|---|---|---|---|
| 5,009,522 A | 4/1991 | Hahn | |
| 5,704,720 A | 1/1998 | Kumada et al. | |
| 6,082,904 A | 7/2000 | Ono et al. | |
| 6,089,756 A | 7/2000 | Ono et al. | |
| 6,273,612 B1 | 8/2001 | Ono et al. | |
| 6,695,482 B2 * | 2/2004 | Niwa et al. | 384/294 |
| 2002/0085779 A1 | 7/2002 | Niwa et al. | |

FOREIGN PATENT DOCUMENTS

| | | |
|---|---|---|
| DE | 3621577 A1 | 2/1987 |
| DE | 10156344 A1 | 5/2002 |
| DE | 10156345 A1 | 5/2002 |
| DE | 10163292 A1 | 7/2002 |
| DE | 10208116 A1 | 9/2002 |

(Continued)

OTHER PUBLICATIONS

Nobutaka Hiramatsu et al; "Experimental Study for High Specific Load Bearings in the Diesel Engine"; SAE 2002 World Congress; Mar. 4-7, 2002; p. 1-8.

*Primary Examiner*—William C Joyce
(74) *Attorney, Agent, or Firm*—Browdy and Neimark, P.L.L.C.

(57) ABSTRACT

There is provided a sliding bearing, which can continuously enhance conformability even when deformation by high oil film pressure in the vicinity of a central part of the sliding bearing occurs. The sliding bearing includes crownings which are each formed in an inclined shape toward an outer peripheral surface from an inner peripheral surface, at end parts in an axial direction, of an inner peripheral surface of a sliding bearing, so that even when the region in the vicinity of the central part of the sliding bearing 1 receives the oil film pressure and deforms in the recessed shape so as for both the end parts in the axial direction to locally contact a shaft, conformability can be enhanced not only at an early stage of use of the sliding bearing but also continuously by relief by the crownings.

18 Claims, 5 Drawing Sheets

A–A

FOREIGN PATENT DOCUMENTS

| | | |
|---|---|---|
| DE | 10208118 A1 | 10/2002 |
| EP | 0 450 679 A2 | 10/1991 |
| JP | 03-249426 | 11/1991 |
| JP | 3-249426 A | 11/1991 |
| JP | 4-39461 Y | 9/1992 |
| JP | 2003269454 A | 9/2003 |

* cited by examiner

A-A

B-B

A-A

B-B

A-A

B-B

SLIDING BEARING

BACKGROUND OF THE INVENTION

The present invention relates to a sliding bearing formed into a half shape two of which are combined with each other to construct a cylindrical shape, with a plurality of groove portions formed along a circumferential direction on its inner peripheral surface each with a predetermined distance between grooves and a predetermined depth dimension.

PRIOR ART

In a sliding bearing for supporting a crankshaft and the like of an internal combustion engine, the sliding bearing is conventionally formed into a half shape two of which are combined with each other to construct a cylindrical shape, and a plurality of groove portions are formed on its inner peripheral surface along a circumferential direction of the bearing, whereby lubricating oil is held in the groove portions, so that seizure and wear due to metal contact of a shaft and the inner peripheral surface of the sliding bearing are restrained by an oil film formed by this lubricating oil. In such sliding bearings with the groove portions formed on the inner peripheral surfaces, there is proposed the one that is worn early to be in conformable contact by increasing a pitch of the groove portion of the part of the sliding bearing, where large load is received from the shaft (for example, JP-A-03-249426), and there is proposed the one that is enhanced in durability by reducing wear by decreasing surface pressure at both end portions in the axial direction of the bearing by increasing the pitch of the groove portions located at both end portions in the axial direction of the sliding bearing because the shaft supported by the sliding bearing generally rotates while being deformed by bending (for example, JP-Y-04-39461) and the like.

SUMMARY OF THE INVENTION

A sliding bearing usually has high oil film pressure by an oil film in the vicinity of a central part in an axial direction at the time of rotation of the shaft, and has low oil film pressure at both end parts in the axial direction. Therefore, the area in the vicinity of the central part receives pressure and separates from the shaft, and both the end parts deform into recessed shapes to get close to the shaft, whereby both end parts of the sliding bearing locally contact the shaft and increase in the surface pressure. In this case, with only the groove portion formed in the vicinity of the both end parts of the sliding bearing, conformable wear occurs only at the early stage of use of the sliding bearing, and conformability cannot be maintained continuously. However, in the sliding bearings disclosed in the above-described JP-A-03-249426 and JP-Y-04-39461, deformation by the high oil film pressure in the vicinity of the central part of the sliding bearing is not considered, and therefore, there arises the above described problem that conformable wear occurs only at the early stage of use of the sliding bearing and conformability cannot be maintained continuously in the vicinity of both the end parts of the sliding bearing.

The present invention is made in view of the above-described circumstances, and its object is to provide a sliding bearing capable of continuously. enhancing conformability even when deformation due to high oil film pressure occurs in the vicinity of the central part of the sliding bearing.

According to the invention, there is provided a sliding bearing which is formed into a half shape two of which are combined with each other to construct a cylindrical shape, with a plurality of groove portions are formed on an inner peripheral surface along a circumferential direction each with a predetermined distance between the grooves and a predetermined depth dimension, the sliding bearing, wherein crownings for preventing interference with a shaft are formed into an inclined shape toward an outer peripheral surface from an inner peripheral surface, at end parts in an axial direction, of the inner peripheral surface, and a depth dimension c of the groove portions and a depth dimension b of the crownings have the following relationships A to C, in a mainly loaded part which is in a predetermined range, in the circumferential direction with a central crown portion of the sliding bearing interposed therein and which mainly receives load when the shaft rotates and an secondary loaded part which receives smaller load than load received by the mainly loaded part:

(A) $1 \leq b/c$ in the mainly loaded part $\leq 200$, (B) $0.1 \leq b/c$ in the secondary loaded part $\leq 20$, and (C) (b/c in the secondary loaded part )<(b/c in the mainly loaded part).

According to the invention, the above-described sliding bearing may be made the sliding bearing characterized in that the projecting portions of the groove portions are each formed into a flat shape and a distance p between grooves of the groove portions and flat portions dimension a of the groove portions have the following relationships D, E and F, in a mainly loaded part which is in the predetermined range, in the circumferential direction with the central crown portion of the sliding bearing interposed therein and which mainly receives load when the shaft rotates and an secondary loaded part which receives smaller load than the load received by the mainly loaded part: (D) $0.01 \text{ mm} \leq p \leq 1.0 \text{ mm}$, (E) $0 \leq a/p < 1.0$, and (F) (a/p in the secondary loaded)$\leq$(a/p in the mainly loaded part)

According to the invention, the above-described sliding bearing may be made the sliding bearing, wherein the projecting portions of the groove portions are each formed into a flat shape and a distance p between grooves of the groove portions and projecting-portion flat portions dimension a of the groove portions have the following relationships D, E and F, in the mainly loaded part which is in the predetermined range, in the circumferential direction with the central crown portion of the sliding bearing interposed therein and which mainly receives load when the shaft rotates and the secondary loaded part which receives smaller load than the load received by the mainly loaded part: (D) $0.01 \text{ mm} \leq p \leq 1.0 \text{ mm}$, (E) the secondary loaded part $0 \leq a/p < 1.0$, the mainly loaded part $0 < a/p < 1.0$, and (F) (a/p in the secondary loaded part)$\leq$(a/p in the mainly loaded part)

According to the invention, the above-described sliding bearing may be made the sliding bearing characterized in that the projecting portions of the groove portions are each formed into a flat shape and a distance p between grooves of the groove portions and a dimension a of flat portions of the groove portions have the following relationships D, E and F, in the mainly loaded part which is in the predetermined range, in the circumferential direction with the central crown portion of the sliding bearing interposed therein and which mainly receives load when the shaft rotates and the secondary loaded part which receives smaller load than the load received by the mainly loaded part: (D) $0.01 \text{ mm} \leq p \leq 1.0 \text{ mm}$, (E) the secondary loaded part $0 \leq a/p \leq 0.4$, the mainly loaded part $0 < a/p \leq 0.7$, and (F) (a/p in the secondary loaded part)$\leq$(a/p in the mainly loaded part)

According to the invention, the sliding bearing may be made the sliding bearing, wherein the above described groove portions are formed so as to make depth thereof larger in the above described secondary loaded part than in the above described mainly loaded part.

According to the invention, the above described sliding bearing may be made the sliding bearing, wherein on the inner peripheral surface at both end parts in the circumferential direction of the above described sliding bearing, crush relieves are formed along the axial direction.

According to the invention, the above described sliding bearing may be made the sliding bearing, wherein in a substantial center of the inner peripheral surface of the above-described sliding bearing, an oil groove is formed along the circumferential direction with a central crown portion (corresponding to the position of the longitudinal center line of the sliding bearing) interposed therein, and an oil groove end raised portion of the oil groove is formed in a position at a predetermined angle in the circumferential direction from an end part of the above described sliding bearing.

According to the invention, the above described sliding bearing may be made the sliding bearing, wherein an overlay layer is formed on its inner peripheral surface.

According to the invention, the crownings are each formed into an inclined shape toward the outer peripheral surface from the inner peripheral surface at the end parts in the axial direction of the inner peripheral surface of the sliding bearing. Therefore, even when the region in the vicinity of the central part of the slidinq bearing receives the oil film pressure and is deformed into the recessed shape, and the both end parts in the axial direction locally contact the shaft, conformability can be enhanced not only at the early stage of use of the sliding bearing but also continuously by relief by the crownings. This is because of the following: when the crownings are not formed, the load received by the end part of the sliding bearing is large, and therefore, conformable wear is easily achieved at the early stage of use, but there is the possibility of occurrence of seizure as a result that wear advances by using the sliding bearing for a long time. On the other hand, by forming the crownings, the state of conformable wear is continued without causing seizure, owing to relief of the crownings even if the sliding bearing is used for a long time. As a result, the sliding bearing can be used even under the harsh conditions of high speed and high load.

Because of (b/c in the secondary loaded part)<(b/c in the mainly loaded part), the depth dimension b of the crowning in the mainly loaded part is formed to be larger than the depth dimension b of the crowning in the secondary loaded part. Therefore, when the region in the vicinity of the central part of the sliding bearing receives the oil film pressure and is deformed into a recessed shape, and both the end parts in the axial direction locally contact the shaft, the deformation amount in the mainly loaded part which receives larger load is larger than the secondary loaded part, but the depth dimension b of the crowning is also formed to be large and has large relief with respect to the shaft. Therefore, it does not happen that both the end parts of the sliding bearing are deformed significantly to get close to the shaft and increase in surface pressure. As a result, in the mainly loaded part which receives large load can be also enhanced in conformability not only at the early stage of use of the sliding bearing but also continuously.

b/c is set in the range of (1≦b/c in the mainly loaded part≦200) and (0.1≦b/c in the secondary loaded part≦20) respectively as described above, but when b/c in the mainly loaded part is less than 1, (the depth dimension c of the groove portions)>(the depth dimension b of the crowning), and because the crowning amount becomes insufficient with respect to the load, uneven contact absorbing ability (conformability) becomes insufficient.

When b/c in the mainly loaded part exceeds 200 on the other hand, the crowing becomes too deep, and the pressure receiving area (load ability) in the loaded state becomes insufficient.

When b/c in the secondary loaded part is less than 0.1, the depth dimension b of the crowning is small, or the depth dimension c of the groove portions becomes large. Since the secondary loaded part is a region on which load is hardly exerted, the influence in the conformability is small and can be ignored even if the depth dimension b of the crowning is small, but if the depth dimension c of the groove portions is large, the groove portions become too large, and the oil film is broken, thus making the sliding performance of the sliding bearing poor.

When b/c in the secondary loaded part exceeds 20 on the other hand, the depth dimension b of the crowning becomes large, or the depth dimension c of the groove portions becomes small. Since the secondary loaded part is the region on which load is hardly exerted, the pressure receiving area does not become insufficient even if the depth dimension b of the crowning is large, and the influence as the sliding bearing can be ignored, but if the depth dimension c of the groove portions is small, the groove portions become too shallow, and the held amount of lubricating oil in the groove portions becomes too small to hold the oil film, thus making the sliding performance as the sliding bearing poor.

According to the invention, desirably (a/p in the secondary loaded part)≦(a/p in the mainly loaded part). Therefore, the contact area of the projecting portion of the secondary loaded part is smaller than the contact area of the projecting portion of the mainly loaded part, thus providing the construction which easily achieves conformable wear by the contact with the shaft. Therefore, the projecting portion achieves conformable wear early by contact with the rotating shaft, and the worn portions take the place of a crush relief, thus making it possible to obtain the function of the crush relief without forming the crush relief. In this case, the area which functions as the crush relief is the minimum required region, and therefore, leakage of the lubricating oil can be reduced as much as possible as compared with the one with the crush relief positively formed. In this case, the groove portion is formed in the circumferential direction, and therefore, leakage of the lubricating oil in the axial direction can be further prevented. Since leakage of the lubricating oil can be prevented in this manner, the required oil amount can be reduced, and a thicker oil film is easily generated between the sliding bearing and the shaft. Therefore, large load from the shaft can be received. Further, by preventing the leakage of the lubricating oil, the amount of lubricating oil between the sliding bearing and the shaft becomes a sufficient amount, and occurrence of cavitation inside the lubricating oil can be suppressed, thus making it possible to prevent corrosion of the surface of the sliding bearing due to cavitation.

Since (a/p in the secondary loaded part) ≦(a/p in the mainly loaded part), the area of the projecting-portion flat portion of the projecting portion of the mainly loaded part becomes larger than the area of the projecting-portion flat portion of the projecting portion of the secondary loaded part, whereby in the mainly loaded part, the contact area with the shaft becomes larger than the secondary loaded part and larger load can be received.

The distance p between the grooves is set in the range of 0.01 mm≦p≦1.0 mm as described above, and if the distance p between the grooves is smaller than 0.01 mm, the sectional areas of the groove portions become too small to hold sufficient lubricating oil. If the distance p between the grooves exceeds 1.0 mm, the contact areas of the projecting portions which will be described later become too large to achieve conformable wear early.

Further, a/p is set in the range of 0≦a/p<1.0 as described above, and this is because the groove portions do not exist if a/p becomes smaller than 1.0.

According to the invention, because of (a/p in the secondary loaded part)≦(a/p in the mainly loaded part), the contact area of the projecting portion of the secondary loaded part is smaller than the contact area of the projecting portion of the mainly loaded part, thus providing the construction which easily achieves conformable wear by the contact with the shaft. Therefore, the projecting portion achieves conformable wear early by contact with the rotating shaft, and the worn portion takes the place of a crush relief, thus making it possible to obtain the function of the crush relief without forming the crush relief. In this case, the region which functions as the crush relief is the minimum required region, and therefore, leakage of the lubricating oil can be reduced as much as possible as compared with the one with the crush relief positively formed. In this case, the groove portion is formed in the circumferential direction, and therefore, leakage of the lubricating oil in the axial direction can be further prevented. Since leakage of the lubricating oil can be prevented in this manner, required oil amount can be reduced, and thicker oil film is easily generated between the sliding bearing and the shaft. Therefore, large load from the shaft can be received. Further, by preventing the leakage of the lubricating oil, the amount of lubricating oil between the sliding bearing and the shaft becomes a sufficient amount, and occurrence of cavitation inside the lubricating oil can be suppressed, thus making it possible to prevent corrosion of the surface of the sliding bearing due to cavitation.

Since (a/p in the secondary loaded part)≦(a/p in the mainly loaded part), the area of the projecting-portion flat portion of the projecting portion of the mainly loaded part becomes larger than the area of the projecting-portion flat portion of the projecting portion of the secondary loaded part, whereby in the mainly loaded part, the contact area with the shaft becomes larger than the secondary loaded part and larger load can be received.

The distance p between the grooves is set in the range of 0.01 mm≦p≦1.0 mm as described above, and if the distance p between the grooves is smaller than 0.01 mm, the sectional areas of the groove portions become too small to hold sufficient lubricating oil. If the distance p between the grooves exceeds 1.0 mm, the contact areas of the projecting portions which will be described later become too large to achieve conformable wear early. a/p is set in the range of 0≦a/p<1.0 as described above, and this is because the groove portions do not exist if a/p becomes smaller than 1.0. Since the secondary loaded part is 0≦a/p, the tip ends sometimes are in sharp shapes as the projecting portions in the secondary loaded part, and therefore, conformable wear due to contact with the shaft is easily achieved. Since in the mainly loaded part, 0<a/p, the tip end is not in a sharp shape as the projecting portion, and the projecting-portion flat portion is formed. Therefore, the contact area with the shaft becomes large and larger load can be received.

According to the invention, desirably (a/p in the secondary loaded part)≦(a/p in the mainly loaded part). Therefore, the contact area of the projecting portion of the secondary loaded part is smaller than the contact area of the projecting portion of the mainly loaded part, thus providing the construction which easily achieves conformable wear by the contact with the shaft. Therefore, the projecting portion achieves conformable wear early by contact with the rotating shaft, and the worn portion takes the place of a crush relief, thus making it possible to obtain the function of the crush relief without forming the crush relief. In this case, the region which functions as the crush relief is the minimum required region, and therefore, leakage of the lubricating oil can be reduced as much as possible as compared with the one with the crush relief positively formed. In this case, the groove portion is formed in the circumferential direction, and therefore, leakage of the lubricating oil in the axial direction can be further prevented. Since leakage of the lubricating oil can be prevented in this manner, required oil amount can be reduced, and thicker oil film is easily generated between the sliding bearing and the shaft. Therefore, large load from the shaft can be received. Further, by preventing the leakage of the lubricating oil, the amount of the lubricating oil between the sliding bearing and the shaft becomes a sufficient amount, and occurrence of cavitation inside the lubricating oil can be suppressed, thus making it possible to prevent corrosion of the surface of the sliding bearing due to cavitation.

Since (a/p in the secondary loaded part)≦(a/p in the mainly loaded part), the area of the projecting-portion flat portion of the projecting portion of the mainly loaded part becomes larger than the area of the projecting-portion flat portion of the projecting portion of the secondary loaded part, whereby in the mainly loaded part, the contact area with the shaft becomes larger than the secondary loaded part and larger load can be received.

The distance p between the grooves is set in the range of 0.01 mm≦p≦1.0 mm as described above, and if the distance p between the grooves is smaller than 0.01 mm, the sectional areas of the groove portions become too small to hold sufficient lubricating oil. If the distance p between the grooves exceeds 1.0 mm, the contact areas of the projecting portions which will be described later become too large to achieve conformable wear early.

a/p is set in the range of 0≦a/p≦0.4 in the secondary loaded part as described above, and a/p is set in the range of 0<a/p≦0.7 in the mainly loaded part, but by setting a/p in the secondary loaded part as 0≦a/p≦0.4, the projecting portions in the secondary loaded part are in the sharp shapes, and therefore, conformable wear of the projecting portions can be achieved earlier. By setting 0<a/p≦0.7 in the mainly loaded part, the projecting portion in the mainly loaded part is not in the sharp shape, and therefore, the projecting portion can be in the suitable shape for receiving large load. The ratio of the width dimension of the projecting-portion flat portion with respect to the distance between the grooves is set at 0.7 or less, whereby the sectional area of the groove portion does not become smaller than necessary and a sufficient amount of lubricating oil can be held.

According to the invention, the groove portions may be formed so that their depth is larger in the above described secondary loaded part than in the above described mainly loaded part. As a result, the projecting portion of the secondary loaded part becomes low in strength as compared with the projecting portion of the mainly loaded part, and conformable wear of the projecting portion of the secondary loaded part can be achieved earlier.

According to the invention, on the inner peripheral surface at both end parts in the circumferential direction of the sliding bearing, crush relieves are desirably formed along the axial direction. As a result, it can be more effectively prevented that deformation in the vicinity of the joint surface of the end parts of the sliding bearing locally contacts the shaft.

According to the invention, in a substantial center of the inner peripheral surface of the sliding bearing, an oil groove is desirably formed along the circumferential direction with a central crown portion interposed therein, and oil groove end raised portion of the oil groove is formed in a position at a predetermined angle in the circumferential direction from an end part of the sliding bearing. The oil groove is formed on the inner peripheral surface of the sliding bearing in this manner, and therefore, sufficient lubricating oil for forming the oil film between the sliding bearing and the shaft can be supplied and secured. The oil groove end raised portion of the oil groove is formed with a predetermined space from the end parts of the sliding bearing, and therefore, the lubricating oil in the oil groove can be prevented from leaking from the end parts of the sliding bearing.

According to the invention, the overlay layer may be formed on the inner peripheral surface of the sliding bearing. Thereby, sliding performance of the sliding bearing can be enhanced.

PREFERRED EMBODIMENTS OF THE INVENTION

Figure 1:
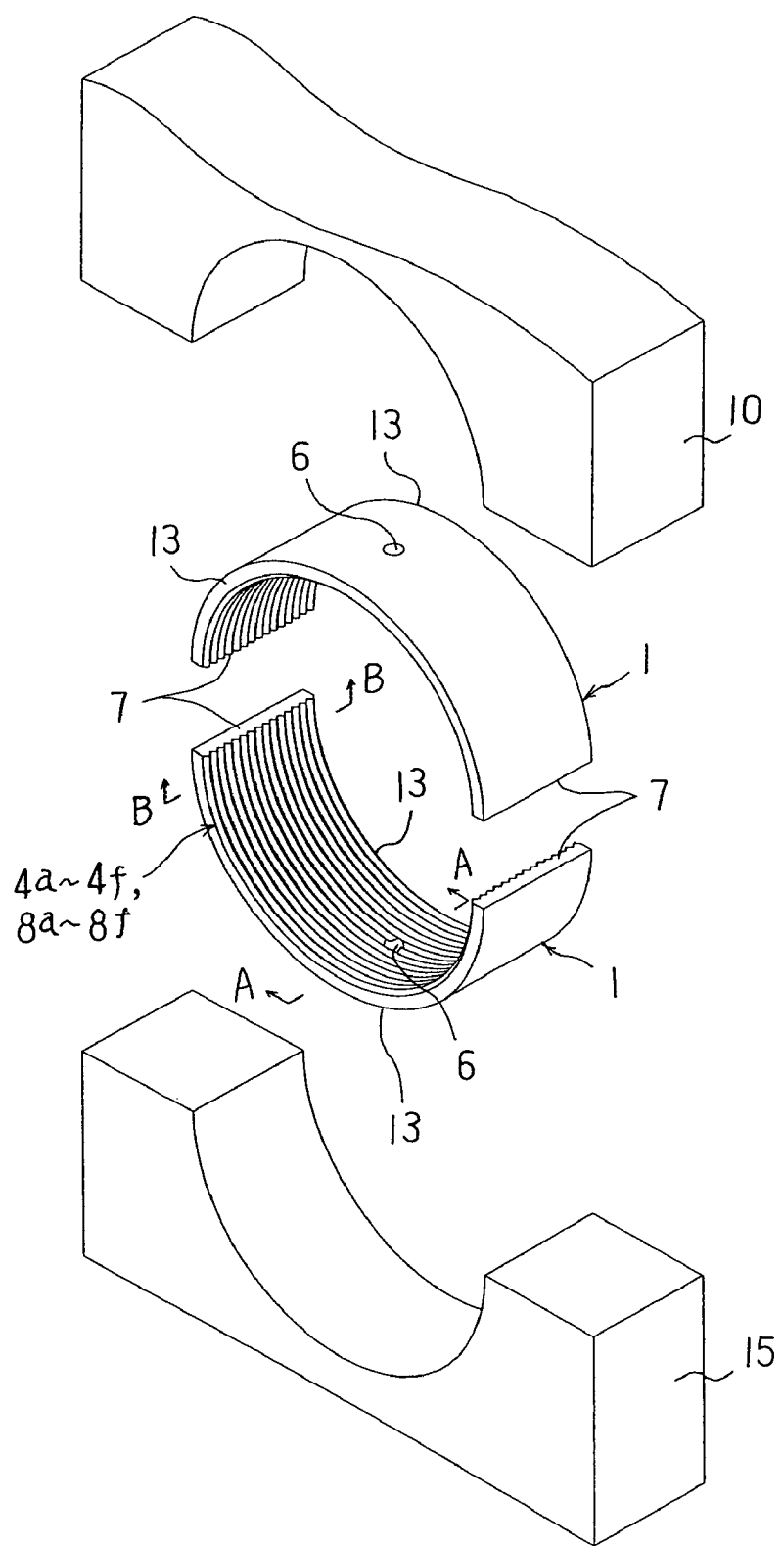
FIG. 1 is an exploded perspective view showing relationship between a housing and a sliding bearing.
Figure 2:
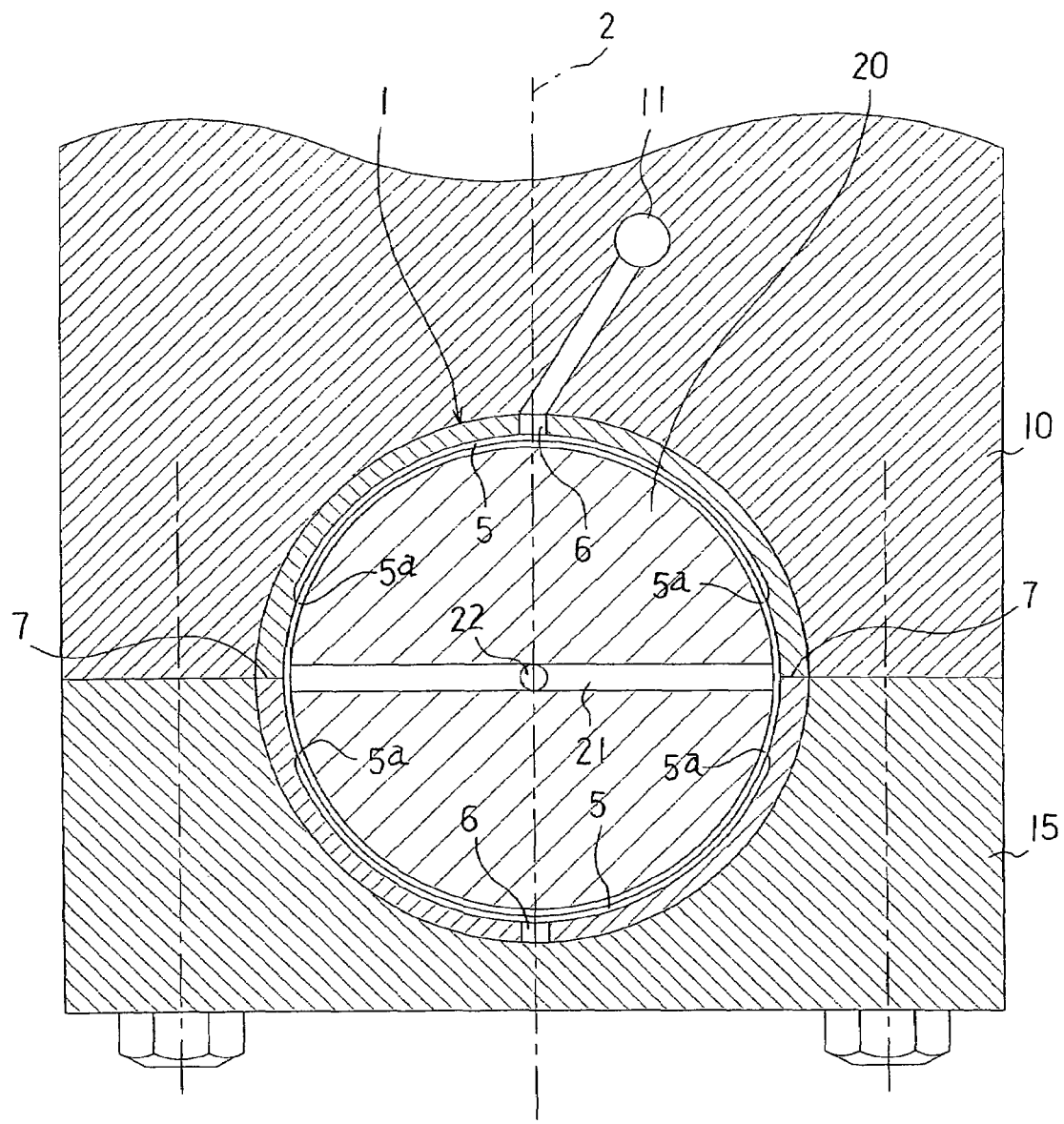
FIG. 2 is a sectional view of a state in which the shaft is supported by the sliding bearing.
Figure 3:
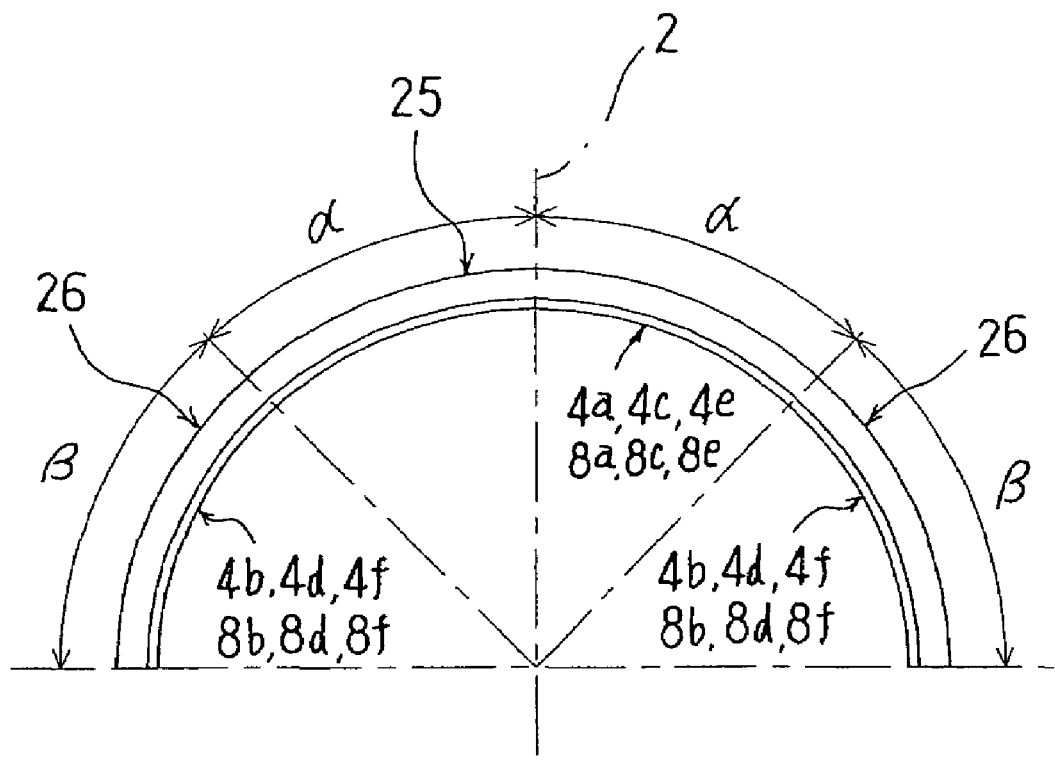
FIG. 3 is a sectional view of the sliding bearing.
Figure 4A:
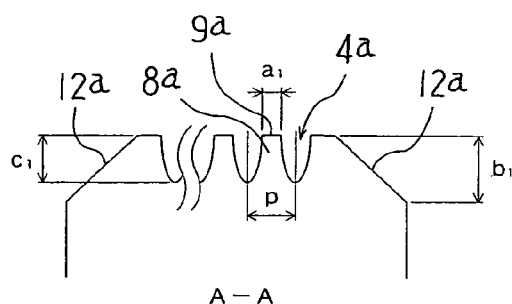
FIGS. 4A to 4F are enlarged sectional views taken along line A-A and line B-B in FIG. 1, respectively.
Figure 4B:
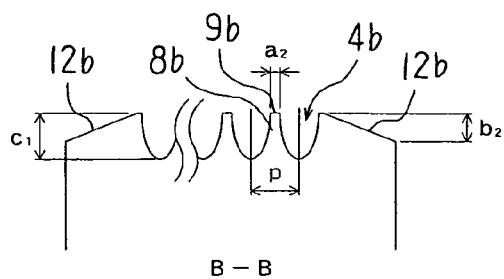
Figure 4C:
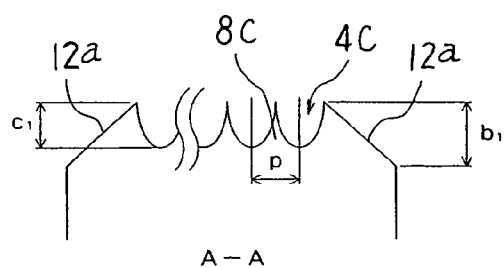
Figure 4D:
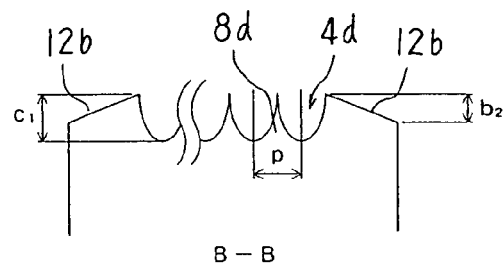
Figure 4E:
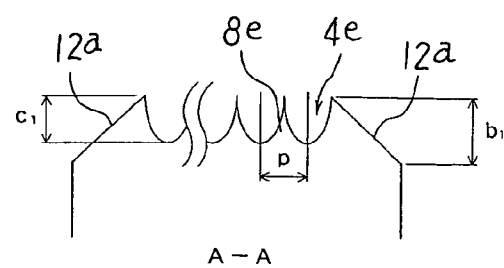
Figure 4F:
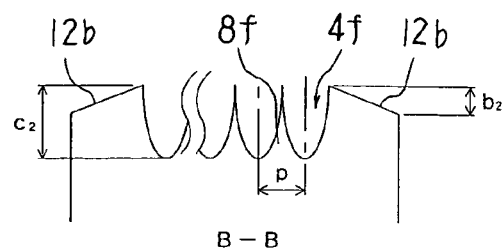
Figure 5:
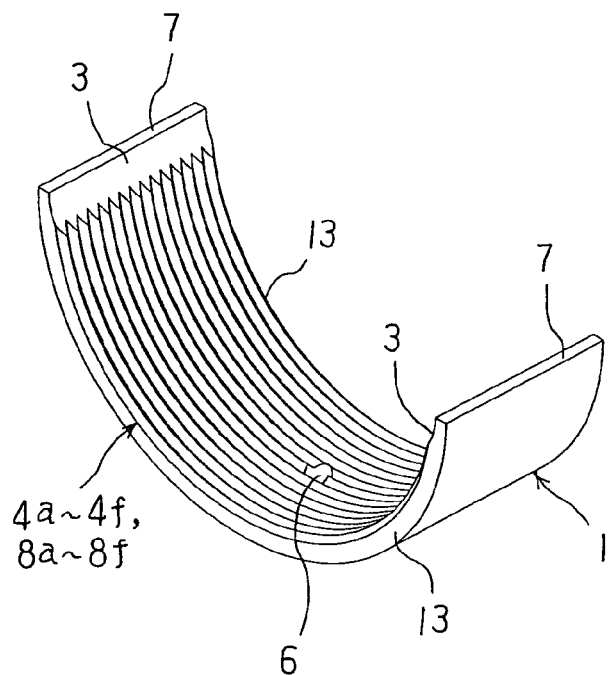
FIG. 5 is a perspective view of the sliding bearing in which crush relieves are formed along an axial direction thereof, on an inner peripheral surface at both end portions in its circumferential direction.
Figure 6:
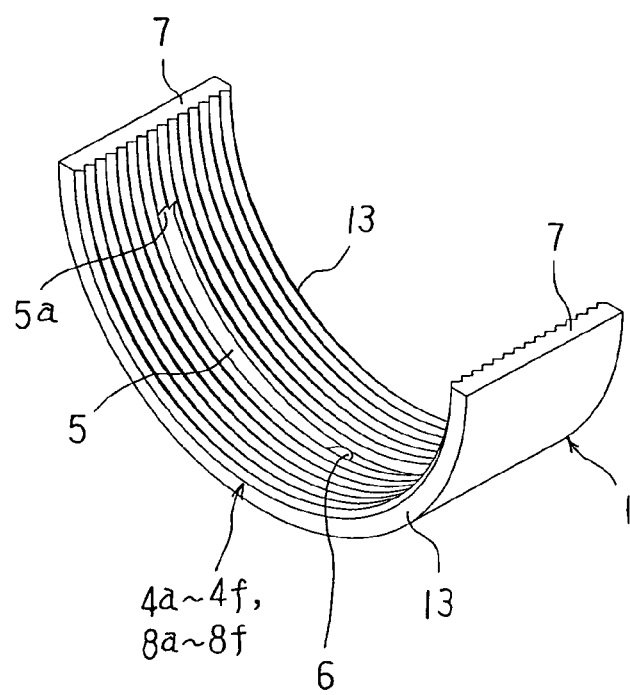
FIG. 6 is a perspective view of the sliding bearing in which an oil groove is formed along the circumferential direction on the inner peripheral surface.

Hereinafter, an embodiment of the present invention will be explained with reference to FIGS. 1 to 6. FIG. 1 is an exploded perspective view showing relationship between housings 10 and 15 and a sliding bearing 1. FIG. 2 is a sectional view of a state in which a shaft 20 is supported by the sliding bearing 1, FIG. 3 is a sectional view (hatching is omitted) of the sliding bearing 1, FIGS. 4A and 4B, 4C and 4D, and 4E and 4F are enlarged sectional views taken along line A-A and line B-B in FIG. 1, respectively, FIG. 5 is a perspective view of the sliding bearing 1 in which crush relieves 3 are formed over an axial direction on an inner peripheral surface of both end parts 7 in a circumferential direction of the sliding bearing 1, and FIG. 6 is a perspective view of the sliding bearing 1 in which an oil groove 5 is formed on the inner peripheral surface along the circumferential direction. It should be noted that the above described drawings are schematic views of the sliding bearing 1 according to the embodiment, and the sliding bearing 1 is depicted with each spot exaggerated or omitted to make it easy to understand a construction, a structure and the like.

As for the sliding bearing 1 according to this embodiment, the sliding bearing which supports a crankshaft and the like of an automobile engine will be explained as one of examples of its use. As shown in FIG. 1, the sliding bearing 1 according to this embodiment is formed into a half shape, and two of the sliding bearings 1 are combined with each other to make it a cylinder shape and rotatably support a shaft 20 (see FIG. 2). In order to satisfy bearing properties of the sliding bearing 1 such as anti-seizing property, the inner periphery surface of the sliding bearing 1 is lined with a slide material of copper alloy, aluminum alloy, zinc alloy or lead alloy, and an overlay layer of zinc or lead alloy or synthetic resin is formed as necessary. By forming the overlay layer, slide property of the sliding bearing 1 can be enhanced.

On the inner peripheral surface of the sliding bearing 1, a plurality of groove portions $4a$ to $4f$ are formed along entire inner peripheral surface in the circumferential direction with a predetermined distance p between the grooves. The distance p between the grooves is set in the rage of $0.01 \text{ mm} \leq p \leq 1.0$ mm, but when the distance p between the grooves is shorter than 0.01 mm, the sectional area of the groove portions $4a$ to $4f$ becomes too small to hold sufficient lubricating oil, and when it exceeds 1.0 mm, a contact area of projecting portions $8a$ to $8f$ which will be described later becomes too large to achieve conforming wear early. The groove portions $4a$ to $4f$ are shown by $4a$, $4c$ and $4e$ in a range of a mainly loaded part 25 (see FIG. 3) which will be described later, and are shown by $4b$, $4d$ and $4f$ in a secondary loaded portion 26 (see FIG. 3) which will be described later. The sectional shapes of the groove portions $4a$ to $4f$ are shown in FIGS. 4A to 4F. FIGS. 4A and 4B are sectional views taken along line A-A and line B-B according to the first embodiment, FIGS. 4C and 4D are sectional views taken along line A-A and line B-B according to a second embodiment, and FIGS. 4E and 4F are sectional views taken along line A-A and line B-B according to a third embodiment. As for the depth of the groove portions $4a$ to $4f$, the depth of the groove portions $4a$ to $4e$ is shown by $c_1$, and the depth of the groove portion $4f$ is shown by $c_2$. $c_1$ and $c_2$ are set in the range of $c_1 \leq 10$ μm, and $c_2 \leq 10$ μm.

At end portions in the axial direction of the inner peripheral surface of the sliding bearing 1, crownings $12a$ and $12b$ for preventing interference of the end parts 7 of the bearing 1 and the shaft 20 are formed each in an inclined shape toward an outer peripheral surface from the inner peripheral surface. The crownings $12a$ and $12b$ are shown by the crowning $12a$ in each of the first to third embodiments in the range of the above described mainly loaded part 25, and are shown by the crowning $12b$ in each of the first to the third embodiments in the above described secondary loaded part 26. The sectional shapes of the crownings $12a$ according to the first to third embodiments in the mainly loaded part 25 are respectively shown in FIGS. 4A, 4C and 4E, and the sectional shape of the crowning $12b$ according to the first to third embodiments in the secondary loaded part 26 are shown in FIGS. 4B, 4D and 4F. The depths of the crowning $12a$ in the mainly loaded part 25 and the crowning $12b$ in the secondary loaded part 26 are respectively shown by $b_1$ and $b_2$ as shown in FIG. 4, and $b_1$ and $b_2$ are set in the range of $b_1 \leq 20$ μm, and $b_2 \leq 20$ μm.

Here, explaining the above-described mainly loaded part 25 and the secondary loaded part 26 with reference to FIG. 3, the mainly loaded part 25 is the part which mainly receives a load at the time of rotating the shaft 20 supported by the sliding bearing 1, and is shown by the predetermined range in the circumferential direction with a central crown part 2, which is a center pf the bearing 1 in the circumferential direction, of the sliding bearing 1 interposed therein. This mainly loaded part 25 is expressed by angles α to the left and right from the central crown part 2 respectively, and the α is usually set in the range from 30 to 60 degrees. The range other than the mainly loaded part 25 is the secondary loaded part 26 which receives smaller load than that received by the mainly loaded part 25 at the time of rotation of the shaft 20, and the secondary loaded part 26 is expressed by an angle β (90 degrees−α). The ranges of the mainly loaded part 25 and the secondary loaded part 26 may not be bilaterally symmetric. As shown in FIGS. 4A to 4F, at tip ends of the protruding portions 8a and 8b among the protruding portions 8a to 8f of the above described groove portions 4a to 4f, flat portions 9a an 9b are respectively formed. As described above, the flat portions 9a and 9b are respectively formed at a tip end of the convex portion 8a of the mainly loaded part 25 and a tip end of the convex portion 8b of the secondary loaded part 26 according to the first embodiment. A supply hole 6 for supplying lubricating oil into the sliding bearing 1 is formed to penetrate through the sliding bearing 1 at a position of the central crown part 2 and in a substantially center in the axial direction of the sliding bearing 1, as shown in FIG. 1.

The sliding bearings 1 constructed as described above are respectively attached to a housing 10 (for example, a cylinder block) and a housing 15 (for example, a cap) which construct the engine, are constructed to be made in a cylindrical shape by combining the housing 10 and the housing 15, and are assembled inside the engine as shown in FIG. 1. The shaft (main shaft) 20 is supported by the sliding bearing 1 assembled inside the engine by the housings 10 and 15 as shown in FIG. 2.

Thus, when the shaft 20 supported by the sliding bearing 1 rotates, the lubricating oil delivered from a lubricating oil supply pump (not shown) is supplied into the sliding bearing 1 via the supply hole 6 from an oil hole 11 formed in the housing 10. Then, an oil film is generated between the sliding bearing 1 and the shaft 20 as a result that oil is supplied onto the entire inner peripheral surface of the sliding bearing 1, and the shaft 20 becomes smoothly rotatable by this oil film. The lubricating oil supplied to an oil groove 5 passes through a second oil passage 22 provided in the axial direction of the shaft 20 from a first oil passage 21 provided to penetrate in the diameter direction of the shaft 20, and is supplied to a sliding bearing (not shown) for supporting a connecting rod shaft (not shown) to lubricate this sliding bearing.

The construction, attachment, operation and the like of the sliding bearing 1 are explained above, and the crownings 12a and 12b, and the groove portions 4a to 4f which construct the essential part of the present invention will be explained with reference to FIGS. 4A to 4F next. In the following explanation, in the case where the convex-portion flat portions 9a is formed on the projecting portion 8a in the mainly loaded part 25, its width dimension is set as $a_1$, while in the case where the projecting-portion flat portion 9b is formed on the projecting portion 8b in the secondary loaded part 26, its width dimension is set as $a_2$, and a generic name of the width dimension $a_1$ and the width dimension $a_2$ is a width dimension a. The depth dimension $c_1$ of the groove portions 4a to 4e is set as $c_1$, while the depth dimension of the groove portion 4f is set as $c_2$, and a generic name of the depth dimension $c_1$ and the depth dimension $c_2$ is a depth dimension c.

First, in the sliding bearing 1 according to the present invention, the crownings 12a and 12b are each formed into an inclined shape toward the outer peripheral surface from the inner peripheral surface at the end parts 13 in the axial direction of the inner peripheral surface of the sliding bearing 1 as described above. The crownings 12a and 12b are formed in this manner, and therefore, even when the region in the vicinity of the central part of the sliding bearing 1 receives the oil film pressure and is deformed into the recessed shape, and the both end parts 13 in the axial direction locally contact the shaft 20, conformability can be enhanced not only at the early stage of use of the sliding bearing 1 but also continuously by relief by the crownings 12a and 12b. This is because of the following: When the crownings 12a and 12b are not formed, the load received by the end part 13 of the sliding bearing 1 is large, and therefore, conformable wear is easily achieved at the early stage of use, but there is the possibility of occurrence of seizure as a result that wear advances by using the sliding bearing 1 for a long time. Therefore, by forming the crownings 12a and 12b, the state of conformable wear is continued without causing seizure, owing to relief of the crownings 12a and 12b. As a result, the sliding bearing 1 can be used even under harsh conditions of high speed and heavy load.

The relationships among the depth dimensions $b_1$ and $b_2$ of the above-described crownings 12a and 12b and the depth dimension cl of the groove portion 4a are respectively, $1 \leq b_1/c_1 \leq 200$, $0.1 \leq b_2/c_1 \leq 20$.

When $b_1/c_1$ is less than 1, (the depth dimension c of the groove portions 4a, 4c and 4e)>(the depth dimension b of the crowning 12a), and because the crowning amount becomes insufficient with respect to the load, uneven contact absorbing ability (conformability) becomes insufficient.

When $b_1/c_1$ exceeds 200 on the other hand, the crowing 12a becomes too deep, and the pressure receiving area (load ability) in the loaded state becomes insufficient.

When $b_2/c_1$ is less than 0.01, the depth dimension $b_2$ of the crowning 12b is small, or the depth dimension $c_1$ of the groove portions 4b, 4d and 4f becomes large. Since the secondary loaded part 26 is a region on which load is hardly exerted, the influence in the conformability is small and can be ignored even if the depth dimension $b_2$ of the crowning 12b is small, but if the depth dimension $c_1$ of the groove portions 4b, 4d and 4f is large, the groove portions 4b, 4d and 4f becomes too deep, and the oil film is broken, thus making the sliding performance of the sliding bearing 1 poor.

When $b_2/c_1$ exceeds 200 on the other hand, the depth dimension $b_2$ of the crowning 12b becomes large, or the depth dimension $c_1$ of the groove portions 4b, 4d and 4f becomes small. Since the secondary loaded part 26 is the region on which load is hardly exerted, the pressure receiving area does not become insufficient even if the depth dimension $b_2$ of the crowning 12b is large, and the influence as the sliding bearing 1 can be ignored, but if the depth dimension $c_1$ of the groove portions 4b, 4d and 4f is small, the groove portions 4b, 4d and 4f become too shallow, and the amount of lubricating oil held in the groove portions 4b, 4d and 4f becomes too small to hold the oil film, thus making the sliding performance as the sliding bearing 1 poor.

The relationship between $b_1/c_1$ and $b_2/c_1$ is $b_2/c_1 < b_1/c_1$, namely, (b/c in the secondary loaded part)<(b/c in the mainly loaded part). Therefore, the depth dimension b of the crowning 12a in the mainly loaded part 25 is formed to be larger than the depth dimension b of the crowning 12b in the secondary loaded part 26. Therefore, when the region in the vicinity of the central part of the sliding bearing 1 receives the oil film pressure and is deformed into a recessed shape, and both the end parts 13 in the axial direction locally contact the shaft 20, the deformation amount in the mainly loaded part 25 which receives larger load is larger than the secondary loaded part 26, but the depth dimension b of the crowning 12a is also formed to be large and has large relief with respect to the shaft 20. Therefore, it does not happen that both the end parts 13 of the sliding bearing 1 are deformed significantly to be close to the shaft 20 to increase in surface pressure. As a result, in the mainly loaded part 25 which receives large load can be also enhanced in conformability not only at the early stage of use of the sliding bearing but also continuously.

In the sliding bearing 1 according to the present invention, the relationships among the above described width dimensions $a_1$ and $a_2$ and the distance p between the grooves are $0 \leq a_1/p < 1.0$, and $0 \leq a_2/p < 1.0$. If $a_1/p$ and $a_2/p$ are not smaller than 1, the groove portions 4a and 4b do not exist as described above, and therefore, $a_1/p < 1.0$, and $a_2/p < 1.0$. The relationship between $a_1/p$ and $a_2/p$ is $a_2/p < a_1/p$. Namely, since (a/p in the secondary loaded part 26)≦(a/p in the mainly loaded part 25), the contact area of the projecting portions 8b to 8d of the secondary loaded part 26 is smaller than the contact area of the projecting portion 8a of the mainly loaded part 25, thus providing the construction which easily achieves conformable wear. Therefore, the projecting portions 8b to 8d achieve conformable wear early by contact with the shaft 20, and the worn portion takes the place of a crush relief 3, thus making it possible to obtain the function, as corrects locally deformation or gap raised in the vicinity of the mating surface of the slide bearing 1, of the crush relief 3 without forming the crush relief 3. In this case, the region which functions as the crush relief 3 is the minimum required region, and therefore, leakage of the lubricating oil can be reduced as much as possible as compared with the one with the crush relief 3 positively formed. In this case, the groove portions 4a to 4d are formed in the circumferential direction, and therefore, leakage of the lubricating oil in the axial direction can be further prevented. Since leakage of the lubricating oil can be prevented in this manner, the required oil amount can be reduced, and thicker oil film is easily generated between the sliding bearing 1 and the shaft 20. Therefore, large load from the shaft 20 can be received thereon. Further, by preventing the leakage of the lubricating oil, the amount of the lubricating oil between the sliding bearing 1 and the shaft 20 becomes sufficient, and occurrence of cavitation inside the lubricating oil can be suppressed, thus making it possible to prevent corrosion of the surface of the sliding bearing 1 due to cavitation.

Since $a_2/p \leq a_1/p$, namely, (a/p in the secondary loaded part 26)≦(a/p in the mainly loaded part 25), the area of the flat portion 9a of the projecting portion 8a of the mainly loaded part 25 becomes larger than the area of the flat portion 9b of the projecting portions 8b to 8d of the secondary loaded part 26, whereby in the mainly loaded part 25, the contact area with the shaft 20 becomes larger than the secondary loaded part 26 and larger load can be received.

Thus, explaining the first embodiment according to the present invention, in the sliding bearing 1 according to the first embodiment, the flat portion 9a is formed at the tip end of the projecting portion 8a of the groove portion 4a of the mainly loaded part 25 (see FIG. 4A), and the flat portion 9b is formed at the tip end of the projecting portion 8b of the groove portion 4b of the secondary loaded part 26 (see FIG. 4B). Since the relationship between the width dimension $a_1$ of the portion 9a and the width dimension $a_2$ of the flat portion 9b is $a_2 < a_1$, the contact area of the projecting portion 8b of the secondary loaded part 26 is smaller than the contact area of the projecting portion 8a of the mainly loaded part 25, thus providing the construction which easily achieves conformable wear by contact with the shaft 20. Therefore, as described above, conformable wear of the projecting portion 8b can be achieved early by contact with the rotating shaft 20.

In the above described first embodiment, the one in which the projecting-portion flat portions 9a and 9b are respectively formed at the projecting portion 8a of the groove portion 4a of the mainly loaded part 25 and the projecting portion 8b of the groove portion 4b of the secondary loaded part 26 is explained, and a second embodiment in which a projecting-portion flat portion is not formed at the tip ends of the projecting portion 8c of the groove portion 4c of the mainly loaded part 25 and the projecting portion 8d of the groove portion 4d of the secondary loaded part 26 will be explained next.

Unlike the projecting portion 8a of the groove portion 4a of the mainly loaded part 25 and the projecting portion 8b of the groove portion 4b of the secondary loaded part 26 according to the first embodiment, the tip ends of a projecting portion 8c of the groove portion 4c of the mainly loaded part 25 and a projecting portion 8d of the groove portion 4d of the secondary loaded part 26 are each in a sharp shape without the flat portion formed thereon, as shown in FIGS. 4C and 4D. Namely, they are expressed by $a_1=0$, $a_1/p=0$, and $a_2=0$, $a_2/p=0$. In this manner, the flat portion is not formed at the tip end of the projecting portion 8d, and thereby, conformable wear of the projecting portion 8d can be achieved early. In this case, in the projecting portion 8c of the groove portion 4c of the mainly loaded part 25, the flat portion 9b may be formed at its tip end, as in the projecting portion 8b of the groove portion 4b of the secondary loaded part 26 according to the first embodiment.

In the above, the second embodiment in which the flat portions are not formed at the tip ends of the projecting portion 8c of the groove portion 4c of the mainly loaded part 25 and the projecting portion 8d of the groove portion 4d of the secondary loaded part 26 is explained, and the groove portions 4b and 4d of the secondary loaded part 26 according to the above described first embodiment and second embodiment are both formed to have the same depth (for example, about 1.5 μm) as the groove portions 4a and 4c of the mainly loaded part 25. The present invention is not limited to such embodiments, but as shown in FIGS. 4E and 4F, the depth dimension $c_2$ of the groove portion 4f in the secondary loaded part 26 may be formed to be deeper (for example, about 5 μm) than the depth dimension $c_1$ of the groove portion 4e in the mainly loaded part 25 (third embodiment). In this manner, the projecting portion 8f of the secondary loaded part 26 becomes lower in strength as compared with the projecting portion 8e of the mainly loaded part 25, and conformable wear of the projecting portion 8f of the secondary loaded part 26 can be achieved early. In this case, the flat portions 9a and 9b may be formed at their tip ends as the projecting portion 8a of the groove portion 4a of the mainly loaded part 25 and the projecting portion 8b of the groove portion 4b of the secondary loaded part 26 according to the first embodiment. In FIGS. 4A, 4B, 4C, 4D, 4E and 4F, the groove portions of the crowning portions are omitted.

The groove portions 4a to 4f and the projecting portions 8a to 8f according to the first to third embodiments are explained thus far, and the explanation that in the mainly loaded part 25, $0 \leq a_1/p < 1$ is set is made. However, it is more preferable to set $a_1/p$ in the range of $0 < a_1/p \leq 0.7$. In this manner, the projecting portion 8a in the mainly loaded part 25 is not in a sharp shape, and therefore, the projecting portion 8a can be formed into the shape suitable for receiving large load. The ratio of the width dimension of the flat portion 9a with respect to the distance between the grooves is made 0.7 or less, whereby, the sectional area of the groove portion 4a does not become unnecessarily small, and a sufficient amount of lubricating oil can be held.

In the first to third embodiments, the explanation that in the secondary loaded part 26, $0 \leq a_2/p < 1$ is set is made. However, it is more preferable to set $a_2/p$ in the range of $0 \leq a_2/p \leq 0.4$. In this manner, the projecting portions 8b, 8d and 8f in the secondary loaded part 26 are in the sharp shapes, and therefore, conformable wear of the projecting portions 8b, 8d and 8f can be achieved early.

In the above-described first to third embodiments, a so-called crush relief 3 is not formed on the inner peripheral surface of both the end portions 7 in the circumferential direction of the sliding bearing 1, but the crush relieves 3 may be formed as shown in FIG. 5. The crush relief 3 is for absorbing deformation in the vicinity of the mating surface which occurs when a deviation occurs to the mating surfaces of the end portions 7 of the sliding bearings 1, or when the height of the sliding bearings 1 is too high, or the like. A deviation and deformation at this mating surfaces become bulge or the like in the diameter direction and locally contacts the shaft 20, and therefore, the inner peripheral surfaces at both end portions 7 in the circumferential direction are previously notched into recessed shapes to form the crush relieves 3, whereby their local contacts are prevented. The crush relief 3 gradually becomes shallower in its depth toward the central crown portion 2 side of the sliding bearing 1. It should be noted that the depth of the crush relief 3 is set in the range of 0.01 to 0.05 mm. In this manner, the crush relief 3 is formed, and thereby, deformation in the vicinity of the mating surfaces of the end portions 7 of the sliding bearings 1 can be more effectively prevented from locally contacting the shaft 20.

In each of the embodiments explained thus far, a so-called oil groove 5 is not formed on the inner peripheral surface along the circumferential direction of the sliding bearing 1, but as shown in FIG. 6, the oil groove 5 may be formed. The oil groove 5 is for supplying lubricating oil between the sliding bearing 1 and the shaft 20, and is formed at a subsequently center in the axial direction along the circumferential direction. The oil groove 5 is formed with a fixed depth over a predetermined range, and its both end portions are formed as oil groove end raised portions 5a. The oil groove end raised portions 5a are formed at the positions at predetermined angles (for example, in the range of 0 to 20 degrees) from the end portions 7 of the sliding bearing 1. In this manner, the oil groove 5 is formed, and thereby, sufficient lubricating oil for forming an oil film between the sliding bearing 1 and the shaft 20 can be ensured. The oil groove end raised portions 5a of the oil groove 5 are formed at predetermined spaces from the end portions 7 of the sliding bearing 1, and therefore, the lubricating oil inside the oil groove 5 can be prevented from leaking from the end portions 7 of the sliding bearing 1.

In the first embodiment, the sliding bearing in which the width of the flat portion 9a at the tip end of the projecting portion 8a in the mainly loaded part 25 is larger than the width of the flat portion 9b at the tip end of the projecting portion 8b is shown, but the present invention is not limited to this, and the sliding bearing in which the width of the flat portion 9a at the tip end of the projecting portion 8a in the mainly loaded part 25 and the width of the flat portion 9b at the tip end of the projecting portion 8b in the secondary loaded part 26 are of the same size may be used. This makes it possible to form the mainly loaded part 25 and the secondary loaded part 26 by the same working process, and thus, the manufacturing cost can be reduced. As for the groove sectional shape, a circular arc shape is shown in FIG. 4, but a V-shape may be applied.

The sliding bearing 1 explained above is the one for supporting the crankshaft or the like of an automobile engine, but the sliding bearing 1 can be also used for the other internal combustion engines and the like without being limited to automobile engines.

The invention claimed is:

1. A sliding bearing formed into a half shape two of which are combined with each other to construct a cylindrical shape, with a plurality of groove portions formed on an inner peripheral surface along a circumferential direction thereof with a predetermined distance between the grooves and a predetermined depth dimension, wherein crownings for preventing interference with a shaft are each formed into an inclined shape toward an outer peripheral surface from an inner peripheral surface, at end parts in an axial direction, of the inner peripheral surface, and a depth dimension c of the groove portions and a depth dimension b of the crownings have the following relationships (A) to (C) in a mainly loaded part which is in a predetermined range, in the circumferential direction with a central crown portion of the sliding bearing interposed therein and which mainly receives load when a shaft rotates and a secondary loaded part which receives smaller load than the load received by the mainly loaded part:

(A) 1≦b/c in the mainly loaded part≦200, (B) 0.1≦b/c in the secondary loaded part≦20, and (C) b/c in the secondary loaded part<b/c in the mainly loaded part; and wherein the value of b in the mainly loaded part is greater than the value of b in the secondary loaded part.

2. The sliding bearing according to claim 1, wherein the projecting portions of the groove portions are each formed into a flat shape and a distance p between grooves of the groove portions and a dimension a of a flat portion of the groove portion have the following relationships (D), (E) and (F) in said mainly loaded part and said secondary loaded part:

(D) 0.01 mm≦p≦1.0 mm, (E) 0≦a/p<1.0, and (F) a/p in the secondary loaded part≦a/p in the mainly loaded part.

3. The sliding bearing according to claim 2, wherein said groove portions are formed so as to make their depth larger in said secondary loaded part than in said mainly loaded part.

4. The sliding bearing according to claim 2, wherein on the inner peripheral surface at both end parts in the circumferential direction of said sliding bearing, crush relieves are formed along the axial direction thereof.

5. The sliding bearing according to claim 2, wherein in a substantial center of the inner peripheral surface of said sliding bearing, an oil groove is formed along the circumferential direction with a central crown portion interposed therein, and wherein an oil groove end raised portion of the oil groove is formed in a position at a predetermined angle in the circumferential direction from an end part of said sliding bearing.

6. The sliding bearing according to claim 2, wherein an overlay layer is formed on the inner peripheral surface of said sliding bearing.

7. The sliding bearing according to claim 1, wherein the projecting portion of the groove portion is formed into a flat shape and a distance p between grooves of the groove portions and a dimension a of a flat portion of the groove portion have the following relationships (D), (E) and (F) in said mainly loaded part and said secondary loaded part:

(D) 0.01 mm≦p≦1.0 mm, (E) the secondary loaded part 0≦a/p<1.0, the mainly loaded part 0<a/p<1.0, and (F) a/p in the secondary loaded part≦a/p in the mainly loaded part.

8. The sliding bearing according to claim 1, wherein the projecting portions of the groove portions are each formed into a flat shape and a distance p between grooves of the groove portions and a dimension a of a flat portion of the groove portion have the following relationships (D), (E) and (F) in said mainly loaded part and said secondary loaded part:

(D) 0.01 mm≦p≦1.0 mm, (E) the secondary loaded part 0≦a/p≦0.4, the mainly loaded part 0<a/p≦0.7, and (F) a/p in the secondary loaded part≦a/p in the mainly loaded part.

9. The sliding bearing according to claim 1, wherein said groove portions are formed so as to make their depth larger in said secondary loaded part than in said mainly loaded part.

10. The sliding bearing according to claim 9, wherein on the inner peripheral surface at both end parts in the circumferential direction of said sliding bearing, crush relieves are formed along the axial direction thereof.

11. The sliding bearing according to claim 9,
wherein in a substantial center of the inner peripheral surface of said sliding bearing, an oil groove is formed along the circumferential direction with a central crown portion interposed therein, and
wherein an oil groove end raised portion of the oil groove is formed in a position at a predetermined angle in the circumferential direction from an end part of said sliding bearing.

12. The sliding bearing according to claim 9, wherein an overlay layer is formed on the inner peripheral surface of said sliding bearing.

13. The sliding bearing according to claim 1, wherein on the inner peripheral surface at both end parts in the circumferential direction of said sliding bearing, crush relieves are formed along the axial direction thereof.

14. The sliding bearing according to claim 13,
wherein in a substantial center of the inner peripheral surface of said sliding bearing, an oil groove is fo med along the circumferential direction with a central crown portion interposed therein, and
wherein an oil groove end raised portion of the oil groove is formed in a position at a predetermined angle in the circumferential direction from an end part of said sliding bearing.

15. The sliding bearing according to claim 13, wherein an overlay layer is formed on the inner peripheral surface of said sliding bearing.

16. The sliding bearing according to claim 1,
wherein in a substantial center of the inner peripheral surface of said sliding bearing, an oil groove is formed along the circumferential direction with a central crown portion interposed therein, and
wherein an oil groove end raised portion of the oil groove is formed in a position at a predetermined angle in the circumferential direction from an end part of said sliding bearing.

17. The sliding bearing according to claim 16, wherein an overlay layer is formed on the inner peripheral surface of said sliding bearing.

18. The sliding bearing according to claim 1, wherein an overlay layer is formed on the inner peripheral surface of said sliding bearing.

* * * * *

UNITED STATES PATENT AND TRADEMARK OFFICE
CERTIFICATE OF CORRECTION

| | | |
|---|---|---|
| PATENT NO. | : 7,572,060 B2 | Page 1 of 1 |
| APPLICATION NO. | : 11/077029 | |
| DATED | : August 11, 2009 | |
| INVENTOR(S) | : Kuroda et al. | |

It is certified that error appears in the above-identified patent and that said Letters Patent is hereby corrected as shown below:

On the Title page,

[*] Notice:    Subject to any disclaimer, the term of this patent is extended or adjusted under 35 USC 154(b) by 873 days.

Delete the phrase "by 873 days" and insert -- by 1188 days --

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,572,060 B2
APPLICATION NO. : 11/077029
DATED : August 11, 2009
INVENTOR(S) : Kuroda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1503 days.

Signed and Sealed this

Seventh Day of September, 2010

David J. Kappos
*Director of the United States Patent and Trademark Office*